United States Patent
Zhou et al.

(10) Patent No.: US 9,155,061 B2
(45) Date of Patent: Oct. 6, 2015

(54) METHOD FOR POSITIONING MOBILE STATION

(75) Inventors: Lei Zhou, Beijing (CN); Xufeng Zheng, Beijing (CN); Fangmin Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 1001 days.

(21) Appl. No.: 13/046,041

(22) Filed: Mar. 11, 2011

(65) Prior Publication Data
US 2011/0222513 A1   Sep. 15, 2011

(30) Foreign Application Priority Data

Mar. 12, 2010 (CN) ............... 2010 1 0124894
Dec. 17, 2010 (CN) ............... 2010 1 0605305

(51) Int. Cl.
| | |
|---|---|
| H04W 64/00 | (2009.01) |
| H04W 4/02 | (2009.01) |
| G01S 5/10 | (2006.01) |
| H04W 36/32 | (2009.01) |
| H04W 28/02 | (2009.01) |
| H04W 48/04 | (2009.01) |
| H04W 40/20 | (2009.01) |
| H04L 5/00 | (2006.01) |

(52) U.S. Cl.
CPC ............... *H04W 64/00* (2013.01); *G01S 5/10* (2013.01); *H04W 4/023* (2013.01); *H04L 5/00* (2013.01); *H04W 28/0226* (2013.01); *H04W 36/32* (2013.01); *H04W 40/20* (2013.01); *H04W 48/04* (2013.01); *H04W 64/003* (2013.01)

(58) Field of Classification Search
None
See application file for complete search history.

(56) References Cited

U.S. PATENT DOCUMENTS

| | | | | |
|---|---|---|---|---|
| 2009/0080379 | A1* | 3/2009 | Takashima | 370/329 |
| 2009/0262696 | A1* | 10/2009 | Wei et al. | 370/329 |
| 2009/0274037 | A1* | 11/2009 | Lee et al. | 370/208 |

(Continued)

FOREIGN PATENT DOCUMENTS

| | | |
|---|---|---|
| CN | 101483455 A | 7/2009 |
| CN | 101541078 A | 9/2009 |

(Continued)

OTHER PUBLICATIONS

Wang et al.; Enhance Downlink Positioning in WiMAX/16m; IEEE Session #57; Document No. IIEE C802.16m-08/1106; Sep. 9, 2008; Kobe.

(Continued)

*Primary Examiner* — Faruk Hamza
*Assistant Examiner* — Andrew Oh
(74) *Attorney, Agent, or Firm* — Jefferson IP Law, LLP

(57) ABSTRACT

A method for positioning a Mobile Station (MS) is provided. The method includes transmitting, by a serving base station of a MS, indication information of a Location Based Services (LBS) zone to the MS receiving, by the MS according to the indication information, a reference signal used for positioning the MS in the LBS zone from a base station of a neighboring cell, wherein the LBS zone is multiplexed with a control information field in N downlink subframes, or with the control information field and a data field in the N downlink subframes, and wherein N is larger than or equal to 1. In the case of restraining interference of a serving cell signal to a neighboring cell signal, the requirements of system resource allocation and Hybrid Automatic Repeat Request (HARQ) timing synchronization can also be satisfied.

16 Claims, 9 Drawing Sheets

(56) References Cited

U.S. PATENT DOCUMENTS

| | | | |
|---|---|---|---|
| 2009/0312008 A1* | 12/2009 | Lindoff et al. | 455/423 |
| 2010/0195566 A1* | 8/2010 | Krishnamurthy et al. | 370/328 |
| 2010/0254342 A1* | 10/2010 | Cho et al. | 370/330 |

FOREIGN PATENT DOCUMENTS

| | | | |
|---|---|---|---|
| EP | 2 120 375 A2 | 11/2009 |
| KR | 10-2005-0050995 A | 6/2005 |
| KR | 10-2007-0079454 A | 8/2007 |
| KR | 10-2009-0085937 A | 8/2009 |

OTHER PUBLICATIONS

Khoryaev et al.; Proposed text on enhanced LBS support (LBS); IEEE 802.16 Broadband Wireless Access Working Group <http://ieee802.org/16>; Aug. 30, 2009.

* cited by examiner

METHOD FOR POSITIONING MOBILE STATION

PRIORITY

This application claims the benefit under 35 U.S.C. §119 (a) of a Chinese patent application filed on Mar. 12, 2010 in the Chinese Intellectual Property Office and assigned Serial No. 201010124894.7, and of a Chinese patent application filed on Dec. 17, 2010 in the Chinese Intellectual Property Office and assigned Serial No. 201010605305.7, the entire disclosures of which are hereby incorporated by reference.

BACKGROUND OF THE INVENTION

1. Field of the Invention

The present invention relates to mobile communication technologies. More particularly, the present invention relates to a method for positioning a Mobile Station (MS).

2. Background of the Invention

Along with an increase in requirements of information services based on position, wireless positioning techniques are becoming a focus of research. In a conventional cellular mobile communication network, the most commonly-used wireless positioning method is a Time Difference of Arrival (TDOA) method. In the TDOA method, a Mobile Station (MS) performs positioning by using signals of at least three cells. A time difference between arrivals of signals from any two cells is calculated and the position of the MS is determined according to the time difference. In this method, the MS need not know a specific time of signal transmission, and common errors generated due to channels can be eliminated or reduced. However, because signals of a serving cell are much stronger than signals of a neighboring cell, the stronger signals of the serving cell will create interference with the signals of the neighboring cell. As a result, there is a larger positioning error. In addition, in the E911 specification, at least 67% of positioning errors within one cell should be within 50 meters and at least 95% of positioning errors within one cell should be within 150 meters. However, the positioning errors in the TDOA method cannot meet the positioning requirements in the E911 specification, which is illustrated in the positioning error curve obtained by the TDOA method in FIG. 1.

FIG. 1 is a schematic diagram illustrating a positioning error curve obtained by a TDOA method in the conventional art.

Referring to FIG. 1, to address the above problem, the conventional art further proposes a method for establishing a Location Based Services (LBS) zone. The first subframe of a frame is taken as the LBS zone used for transmitting a reference signal of the neighboring cell, i.e. all time-frequency resources of the first subframe are used for transmitting the reference signal of the neighboring cell, and thus the MS can perform positioning according to the reference signal of each neighboring cell in the LBS zone received. Although this method can effectively restrain the interference of the signals of the serving cell on the signals of the neighboring cell and can increase positioning precision, this method will greatly affect Hybrid Automatic Repeat Request (HARQ) timing synchronization, and even more greatly in the case where the proportion of uplink subframes to downlink subframes in one frame is 4:4. In addition, with respect to a Time Division Duplexing (TDD) system, because the first subframe of a frame is completely taken as the LBS zone used for transmitting the reference signal of the neighboring cell in this method, uplink resources may not be allocated to a terminal, which greatly affects allocation and scheduling of system resources and disturbs normal operations of the TDD system.

SUMMARY OF THE INVENTION

An aspect of the present invention is to address at least the above-mentioned problems and/or disadvantages and to provide at least the advantages described below. Accordingly, an aspect of the present invention is to provide a method for positioning a mobile station, which can meet requirements of system resource allocation and Hybrid Automatic Repeat Request (HARQ) timing synchronization in the case of restraining interference of signals of a serving cell on signals of a neighboring cell.

In accordance with an aspect of the present invention a method for positioning a Mobile Station (MS) is provided. The method includes transmitting, by a serving base station of a MS, indication information of a Location Based Services (LBS) zone to the MS and receiving, by the MS according to the indication information, a reference signal for positioning the MS in the LBS zone from a base station of a neighboring cell, wherein the LBS zone is multiplexed with a control information field in N downlink subframes or with the control information field and a data field in the N downlink subframes, and N is larger than or equal to 1.

As can be seen from the above technical solution, in the present invention, time-frequency resources corresponding to a preset frequency band occupied by Orthogonal Frequency Division Multiplexing (OFDM) symbols in N downlink subframes in a super frame are taken as the LBS zone, and then the serving base station transmits the indication information containing information of the super frame where the LBS zone is located. The indication information may include position information of the LBS zone, a transmission mode of the LBS zone such as periodically or event triggering or once transmission, and information for indicating the MS to report a measurement result, so that the MS can receive the reference signal in the specific LBS zone, detect the reference signal in the specific LBS zone, and transmit a detection result to a base station through signaling or perform positioning calculation based on the detection result. In addition, the time-frequency resources corresponding to the preset frequency band occupied by the OFDM symbols in the N downlink subframes are taken as the LBS zone, while the time-frequency resources corresponding to the rest frequency bands in the downlink subframes may be used for transmitting a control signal, or used for transmitting a control signal and a data signal. Therefore, transmission of information such as Acknowledgement (ACK) or Negative Acknowledgement (NACK) in subframes can be ensured and uplink resources can be allocated to the MS. Further, HARQ timing synchronization requirements are satisfied and meanwhile system resource allocation principles are followed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
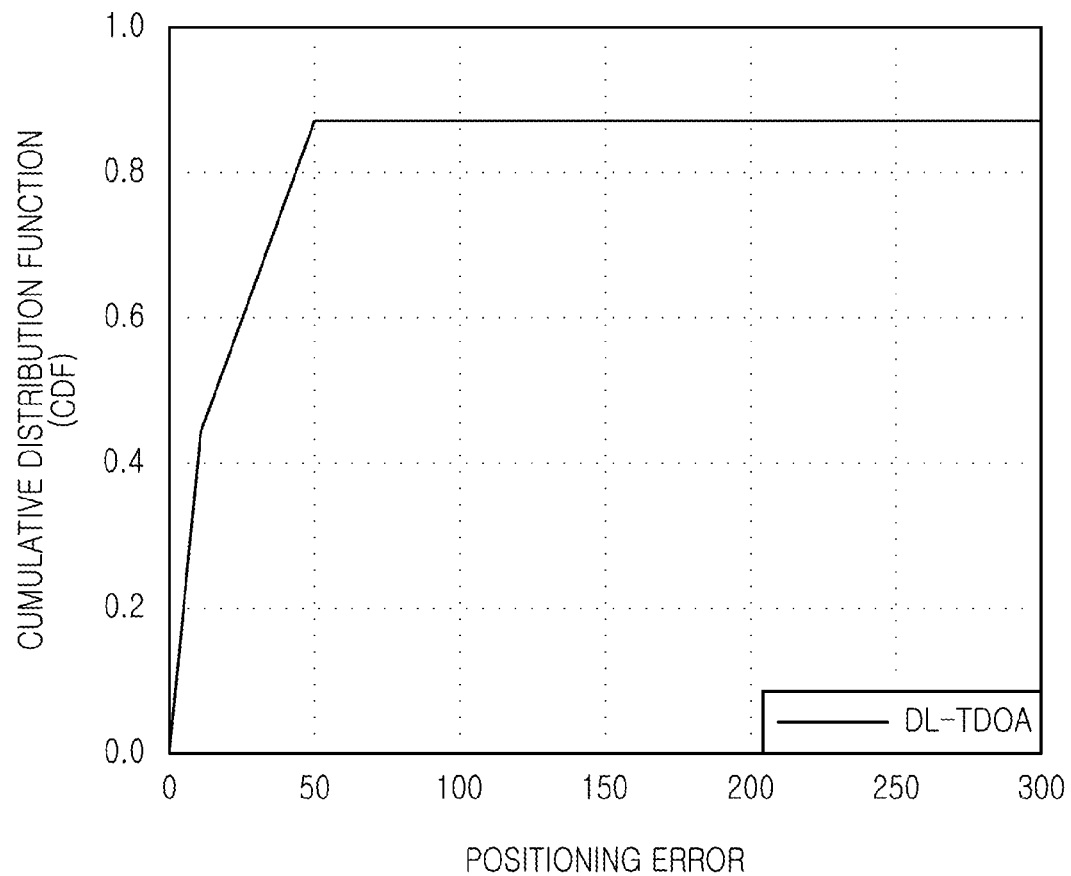
FIG. 1 is a schematic diagram illustrating a positioning error curve obtained by a Time Difference Of Arrival (TDOA) method in the conventional art.
Figure 2:
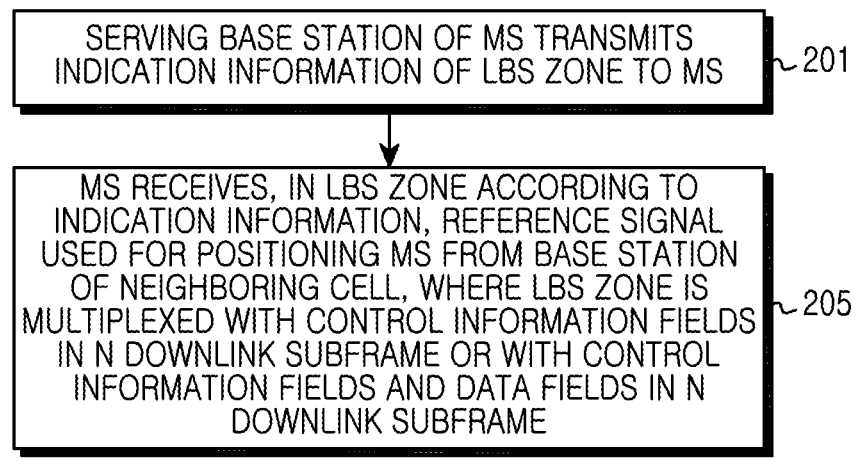
FIG. 2 is a flowchart of a method according to an exemplary embodiment of the present invention.

FIG. 2 is a flowchart of a method according to an exemplary embodiment of the present invention.

Referring to FIG. 2, a serving base station of a Mobile Station (MS) transmits indication information of a Location Based Services (LBS) zone to the MS in step 201. The indication information in step 201 may contain position information of the LBS zone, transmission methods of the LBS zone, such as periodically, event triggering and once transmission, and information for indicating the MS to report a measurement result.

In step 202, the MS receives, in the LBS zone according to the indication information, a reference signal used for positioning the MS from a base station of a neighboring cell. The LBS zone in Step 202 is multiplexed with control information fields in N downlink subframes or with control information fields and data fields in N downlink subframes, where N is larger than or equal to 1.

Two exemplary embodiments are described below corresponding to a case in which in N is equal to 1 and a case in which N is larger than 1.

Exemplary Embodiment 1

Embodiment 1 describes the case in which N is equal to 1. In Embodiment 1, the LBS zone may consist of time-frequency resources corresponding to a preset frequency band occupied by Orthogonal Frequency Division Multiplexing (OFDM) symbols in one downlink subframe of one super frame other than OFDM symbols which are currently occupied. The OFDM symbols which are currently occupied are mainly used to bear some signals for dedicated purposes, e.g., downlink synchronization signals, or signals for other purposes such as a Midamble used for channel estimation. Frequency bands other than the preset frequency band in the downlink subframe may also be used as the control information field, or used as the control information field and the data field. The control information field may be used for transmitting an A-MAP control signal and the data field may be used for transmitting a data signal such as Acknowledgement (ACK) or Negative Acknowledgement (NACK). According to an exemplary embodiment of the present invention, the downlink subframe is multiplexed by the reference signal used for positioning, the control signals, and the data signals in a Frequency Division Multiplexing (FDM) mode.

Figure 3:
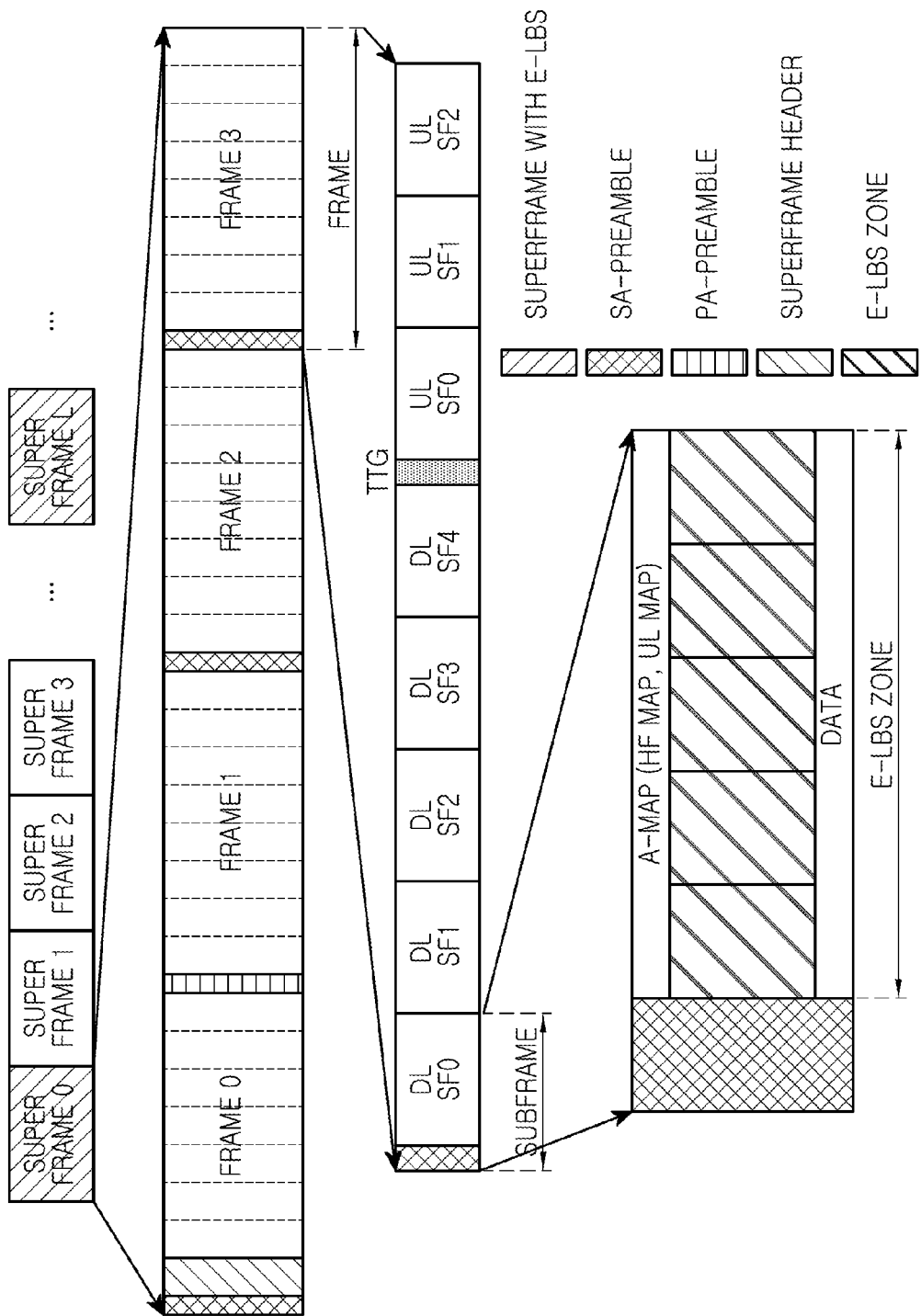
FIG. 3 is a schematic diagram illustrating a Location Based Services (LBS) zone according to an exemplary embodiment of the present invention.

FIG. 3 is a schematic diagram illustrating a LBS zone according to an exemplary embodiment of the present invention.

Referring to FIG. 3, one super frame contains four frames and each frame contains Uplink frames (ULs) and Downlink frames (DLs). Based on the foregoing description, the LBS zone may be configured in one of the downlink frames of one frame in a super frame. Exemplary Embodiment 1 is described by an example in which the LBS zone is configured in the first downlink frame of the last frame, i.e. Frame 3, in super frame 0. Because the first downlink frame contains a synchronization signal, the LBS zone may include the time-frequency resources corresponding to a preset frequency band occupied by OFDM symbols in the first downlink subframe other than OFDM symbols occupied by the synchronization signal, while frequency bands other than the preset frequency band are still taken as the control information field or taken as the control information field and the data field. The preset frequency band is determined by taking positioning performance requirements as well as necessary time-frequency resources occupied by the control information field and the data field into consideration. For example, in order to meet the E911 positioning performance requirements, the time-frequency resources corresponding to 144 subcarriers occupied by 5 OFDM symbols may be taken as the LBS zone.

In step 202, in at least one of the Time Division Multiplexing (TDM) mode and the FDM mode, the base station of the neighboring cell may transmit, according to the LBS zone configured, the reference signal used for positioning the MS. The base station of the neighboring cell may transmit the reference signal by way of transmitting the reference signal on time-frequency resources which are allocated to the neighboring cell. The time-frequency resources may be allocated to the neighboring cell according to a reference signal transmission policy described hereinafter.

The reference signal transmission policy in Exemplary Embodiment 1 may be implemented in different ways. While exemplary implementations are described below, additional implementations may also be employed.

In a first exemplary implementation, OFDM symbols occupied by the LBS zone are numbered sequentially from a first preset value such as 0, and the time-frequency resources may be allocated to each neighboring cell according to a principle that different neighboring cells correspond to time-frequency resources of different OFDM symbols. The first exemplary implementation may be implemented as follows:

For each neighboring cell, a "neighboring cell Identity (ID) or neighboring cell sector ID" is divided by "the total number of OFDM symbols contained in the LBS zone" to obtain a remainder, and time-frequency resources contained in an OFDM symbol with a sequence number equal to the remainder are allocated to this neighboring cell.

As another exemplary embodiment of the present invention, the first exemplary implementation may be replaced by the following: the time-frequency resources of the OFDM symbols contained in the LBS zone may be allocated to each neighboring cell according to a principle that time-frequency resources of at least two neighboring OFDM symbols on the same frequency are allocated to different neighboring cells.

In a second exemplary implementation, the OFDM symbols occupied by the LBS zone and frequency resources corresponding to the OFDM symbols are divided into more than one resource block, i.e. time-frequency resource blocks. All of the obtained time-frequency resource blocks are grouped into more than one resource group. All of the obtained resource groups are respectively allocated to corresponding neighboring cells.

All time-frequency resources contained in the LBS zone are divided into several time-frequency resource blocks, and the time-frequency resource blocks are grouped to obtain the resource groups. The resource groups are numbered sequentially from a second preset value (the second preset value need not relate to the first preset value, and for example, may be 0). A "neighboring cell ID or neighboring cell sector ID" is divided by a "section number of a neighboring cell" to obtain a first remainder, and "the first remainder" is divided by "the total number of resource groups obtained from the LBS zone" to obtain a second remainder. A resource group with a sequence number equal to the second remainder is allocated to the neighboring cell. The above processing may be described by a formula (1):

$$RS_{Idx} = \mathrm{mod}(\mathrm{mod}(IDcell, N), Q) \qquad (1)$$

In formula (1), IDcell represents the neighboring cell ID or neighboring cell sector ID corresponding to the base station of the neighboring cell; N represents the section number, or a sector number of each sector in the neighboring cell, which may be 0, 1, 2; Q represents the total number of the resource groups contained in the LBS zone; and $RS_{Idx}$ represents a specific resource group allocated to the neighboring cell corresponding to the IDcell.

Through the second exemplary implementation above, the time-frequency resources contained in the LBS zone can be allocated to the neighboring cell. In step 202, the base station of the neighboring cell may transmit the reference signal on the time-frequency resources contained in the resource group allocated to the neighboring cell.

Figure 4:
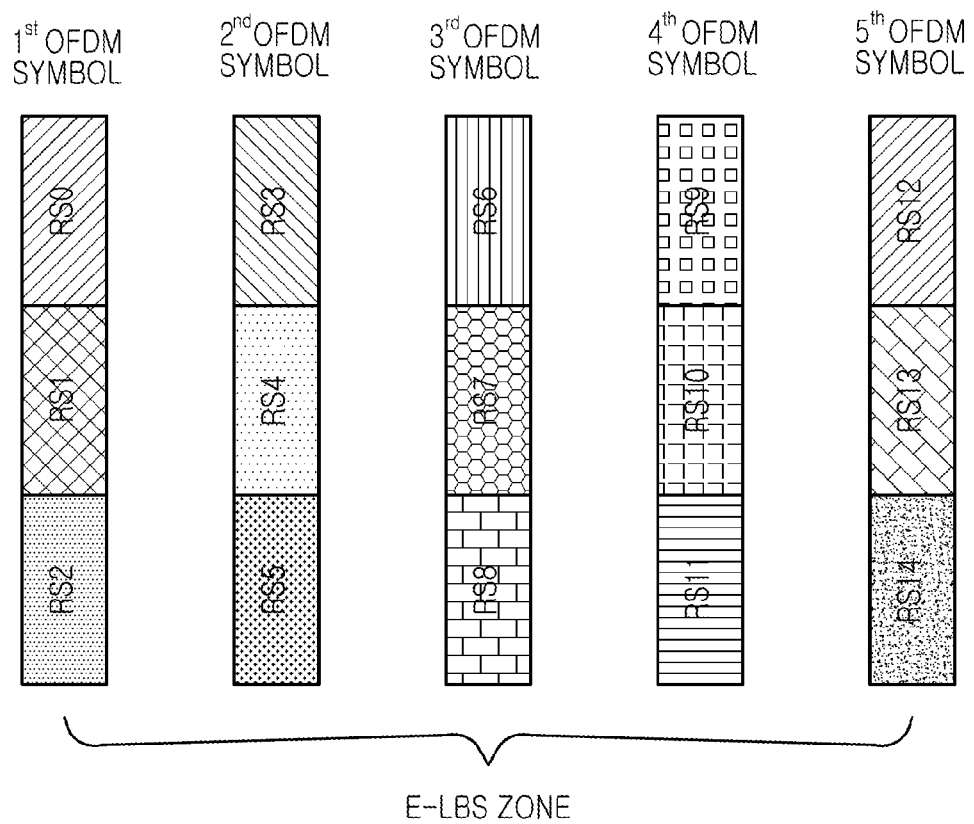
FIG. 4 is a schematic diagram illustrating physical layer resource allocation in the LBS zone according to an exemplary embodiment of the present invention.

FIG. 4 is a schematic diagram illustrating physical layer resource allocation in the LBS zone according to an exemplary embodiment of the present invention.

Referring to FIG. 4, suppose the LBS zone occupies part of time-frequency resources of 5 OFDM symbols, if frequency resources of the LBS zone contained in each OFDM symbol are divided into 3 blocks, which are frequency domain resource blocks 0~2 as shown in Table 1 below. Accordingly, 15 time-frequency resource blocks are obtained in FIG. 4. If each time-frequency resource block is taken as one resource group, then 15 resource groups are obtained in FIG. 4, which are RS0 to RS14 respectively. Therefore, based on the second implementation, 15 resource groups are respectively allocated to 15 neighboring cells to be used. Sectors in each neighboring cell are not differentiated but can use all of the time-frequency resources. Taking the physical layer resource allocation in the LBS zone shown in FIG. 4 as an example, specific resource group allocation according to the formula (1) can be illustrated in Table 1 below:

TABLE 1

| Frequency domain resources allocated | OFDM symbols occupied by E-LBS zone | | | | |
|---|---|---|---|---|---|
| | $1^{st}$ OFDM symbol | $2^{nd}$ OFDM symbol | $3^{rd}$ OFDM symbol | $4^{th}$ OFDM symbol | $5^{th}$ OFDM symbol |
| Frequency domain resource block 0 | RS0 | RS3 | RS6 | RS9 | RS12 |
| Frequency domain resource block 1 | RS1 | RS4 | RS7 | RS10 | RS13 |
| Frequency domain resource block 2 | RS2 | RS5 | RS8 | RS11 | RS14 |

In order to reduce interference from the reference signal, the second exemplary implementation may be replaced by other implementation as extension of the second exemplary implementation, e.g., a random transmission implementation. Specifically, the OFDM symbols occupied by the LBS zone and frequency resources corresponding to the OFDM symbols are divided into more than one resource block. Multiple time-frequency resource blocks are obtained, and all of the obtained time-frequency resource blocks are grouped into the resource groups. All of the obtained resource groups are respectively allocated to corresponding neighboring cells, which may be implemented in the predefined manner described above. With respect to a resource group allocated to a neighboring cell, if the resource group contains multiple different time-frequency resource blocks, the base station of the neighboring cell may randomly select part or all of the time-frequency resources in the resource group to transmit the reference signal.

With respect to the random transmission implementation, when the resource group allocated to the neighboring cell contains several time-frequency blocks, how the base station of the neighboring cell randomly selects part or all of the time-frequency resources in the resource group to transmit the reference signal is described below. The base station may first obtain one random number, the random number being time-variant and evenly-distributed. "the random number obtained" is divided by "the number of possible transmission solutions by using time-frequency resource blocks contained in the resource group" to obtain a remainder, and a transmission solution with a sequence number equal to the remainder is determined as a selected transmission solution. The selected transmission solution is used to transmit the reference signal. The selected transmission solution indicates which time-frequency resources in the resource group are used to transmit the reference signal.

The above processing may be represented by formula (2) and formula (3) below:

$$Y_{rand} = (X_{rand\_seed} * m + n) \bmod j \quad (2)$$

$$P_{position} = \bmod(Y_{rand}, C) \quad (3)$$

In formula (2), at least one of m and n is a prime number, j is a prime number and is the maximum random number which can be obtained by the base station of the neighboring cell, and $X_{rand\_seed}$ represents a random seed number. In formula (3), c represents the number of possible transmission solutions by using the resource group, and $P_{position}$ represents a specific transmission solution.

The above transmission solutions are only examples, and should not be understood as limiting the present invention. Other implementations not described herein, such as interlacing, may also be used.

In the replacement implementation, if the base station of the neighboring cell does not differentiate time-frequency resource blocks corresponding to sectors of the neighboring cell when transmitting the reference signal to the MS, i.e. if the neighboring cell contains multiple sectors, the base station of the neighboring cell may transmit the reference signal by uniformly using one time-frequency resource. Alternatively, when the resource group corresponding to the neighboring cell contains multiple time-frequency resource blocks, the base station of the neighboring cell may transmit the reference signal using one or more time-frequency resource blocks contained in the resource group corresponding to the neighboring cell according to a principle of avoiding interference from the reference signal.

Figure 5:
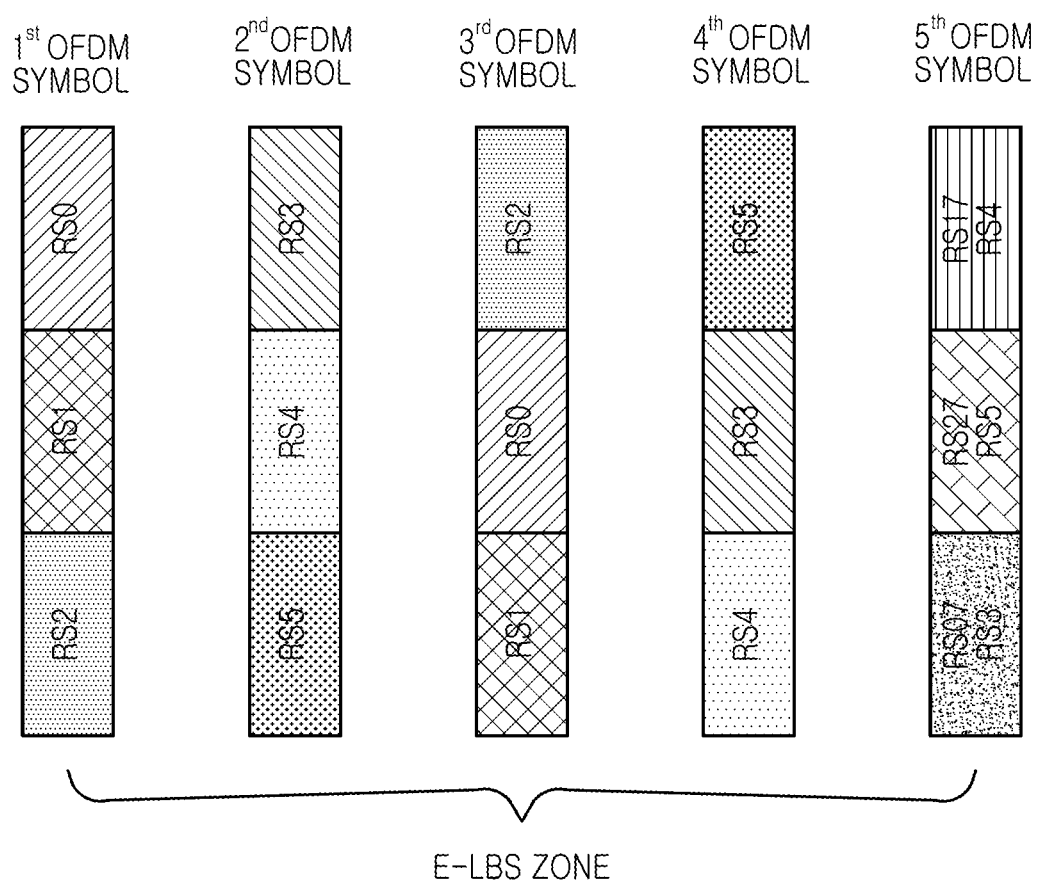
FIG. 5 is another schematic diagram illustrating physical layer resource allocation in the LBS zone according to an exemplary embodiment of the present invention.

FIG. 5 is another schematic diagram illustrating physical layer resource allocation in the LBS zone according to an exemplary embodiment of the present invention.

Referring to FIG. 5, the LBS zone occupies part of time-frequency resources of 5 OFDM symbols, if frequency resources of the LBS zone contained in each OFDM symbol are divided into 3 blocks, which are frequency domain resource blocks 0~2. Accordingly, 15 time-frequency resource blocks can be obtained in FIG. 5. If each time-frequency resource block is taken as one resource group, then 15 resource groups are obtained in FIG. 5, which are RS0 to RS14.

FIG. 5 differs from FIG. 4 in that the 15 resource groups in this exemplary embodiment are not allocated to 15 neighboring cells to be used, but are instead allocated to 6 neighboring cells to be used. In this case, each neighboring cell uses 2.5 resource groups. However, there is no 0.5 resource group in practical resources. Instead, two neighboring cells share a certain resource group. As shown in FIG. 5, if of the 3 time-frequency resource blocks in the fifth OFDM symbol is shared by base stations of two neighboring cells, then Q in the formula (1) can be set as 6 for the 5 OFDM symbols, or Q in the formula (1) can be set as 6 for the former 4 OFDM symbols and set as 3 for the fifth OFDM symbol. Allocation of the 6 resource groups can be shown in Table 2 below:

TABLE 2

| Frequency domain resources allocated | D-LBS zone symbol number | | | | |
|---|---|---|---|---|---|
| | $1^{st}$ OFDM Symbol | $2^{nd}$ OFDM symbol | $3^{rd}$ OFDM symbol | $4^{th}$ OFDM symbol | $5^{th}$ OFDM symbol |
| Frequency domain resource block 0 | RS0 | RS3 | RS2 | RS5 | RS1/RS4 |
| Frequency domain resource block 1 | RS1 | RS4 | RS0 | RS3 | RS2/RS5 |
| Frequency domain resource block 2 | RS2 | RS5 | RS1 | RS4 | RS0/RS3 |

As can be seen from Table 2, RS1 and RS4 share the frequency domain resource block 0 in the fifth OFDM symbol, RS2 and RS5 share the frequency domain resource block 1 in the fifth OFDM symbol, and RS0 and RS3 share the frequency domain resource block 2 in the fifth OFDM symbol.

If the base station of the neighboring cell transmits the reference signal by using RS0 in Table 2, when transmitting the reference signal, the base station of the neighboring cell finds that the resource groups allocated to itself contain three different time-frequency resource blocks. These different time-frequency resource blocks include the frequency domain resource block 0 in the resource group 0 in the $1^{st}$ OFDM symbol, the frequency domain resource block 1 in the resource group 1 in the $3^{rd}$ OFDM symbol, and the frequency domain resource block 2 in the resource group 2 in the $5^{th}$ OFDM symbol. Based on this situation, when the formula (2) and formula (3) are used, the total number of possible transmission solutions may be determined by using the time-frequency resource blocks contained in the RS0. Considering performances such as avoiding reference signal interference, it is supposed that the total number of possible transmission solutions is 6, which are shown in Table 3:

TABLE 3

| | Symbol No. | | | | |
|---|---|---|---|---|---|
| No. | $1^{st}$ OFDM symbol | $2^{nd}$ OFDM symbol | $3^{rd}$ OFDM symbol | $4^{th}$ OFDM symbol | $5^{th}$ OFDM symbol |
| 1 | RS0 | | | | |
| 2 | | | RS0 | | |
| 3 | RS0 | | RS0 | | |
| 4 | RS0 | | | | RS0 |
| 5 | | | RS0 | | RS0 |
| 6 | RS0 | | RS0 | | RS0 |

The total number of possible transmission solutions is put into the formula (3) and the final (i.e., specific) transmission solution can thus be determined. The final transmission solution is used for transmitting the reference signal. For example, the final transmission solution is the transmission solution No. 1 in Table 3, and the reference signal is transmitted in the frequency domain resource block 0 in the resource group group 0 of the $1^{st}$ OFDM symbol.

The foregoing describes the reference signal transmission policy provided by Exemplary Embodiment 1 of the present invention. This exemplary embodiment should not be understood as limiting applications of the present invention.

After receiving the reference signal, the MS may use the reference signal to perform the MS positioning. Specific positioning implementations may be similar to the conventional TDOA method. If the replacement implementation is used when receiving the reference signal transmitted by the RS0, then the MS may select a time-frequency resource with the best signal-noise ratio because the time-frequency resources allocated to the RS0 are three different time-frequency resource groups. Using the conventional TDOA method, the MS performs the MS positioning according to the reference signal transmitted by the RS0 on the time-frequency resource with the best signal-noise ratio.

Exemplary Embodiment 2

Exemplary Embodiment 2 describes a case in which N is larger than 1, and takes N equal to 4 as an example. Other values of N may also be implemented in a similar fashion.

Based on the above, the LBS zone in Exemplary Embodiment 2 may contain part of OFDM symbols in one downlink subframe of each of 4 super frames, while other OFDM symbols may be taken as a control information field, or a control information domain and a data field. In Exemplary Embodiment 2, 4 downlink subframes are multiplexed in a TDM mode by the LBS zone and the control information field, or by the LBS zone, the control information field, and the data field. The 4 super frames may be 4 continuous super frames, or 4 discontinuous super frames.

Figure 6:
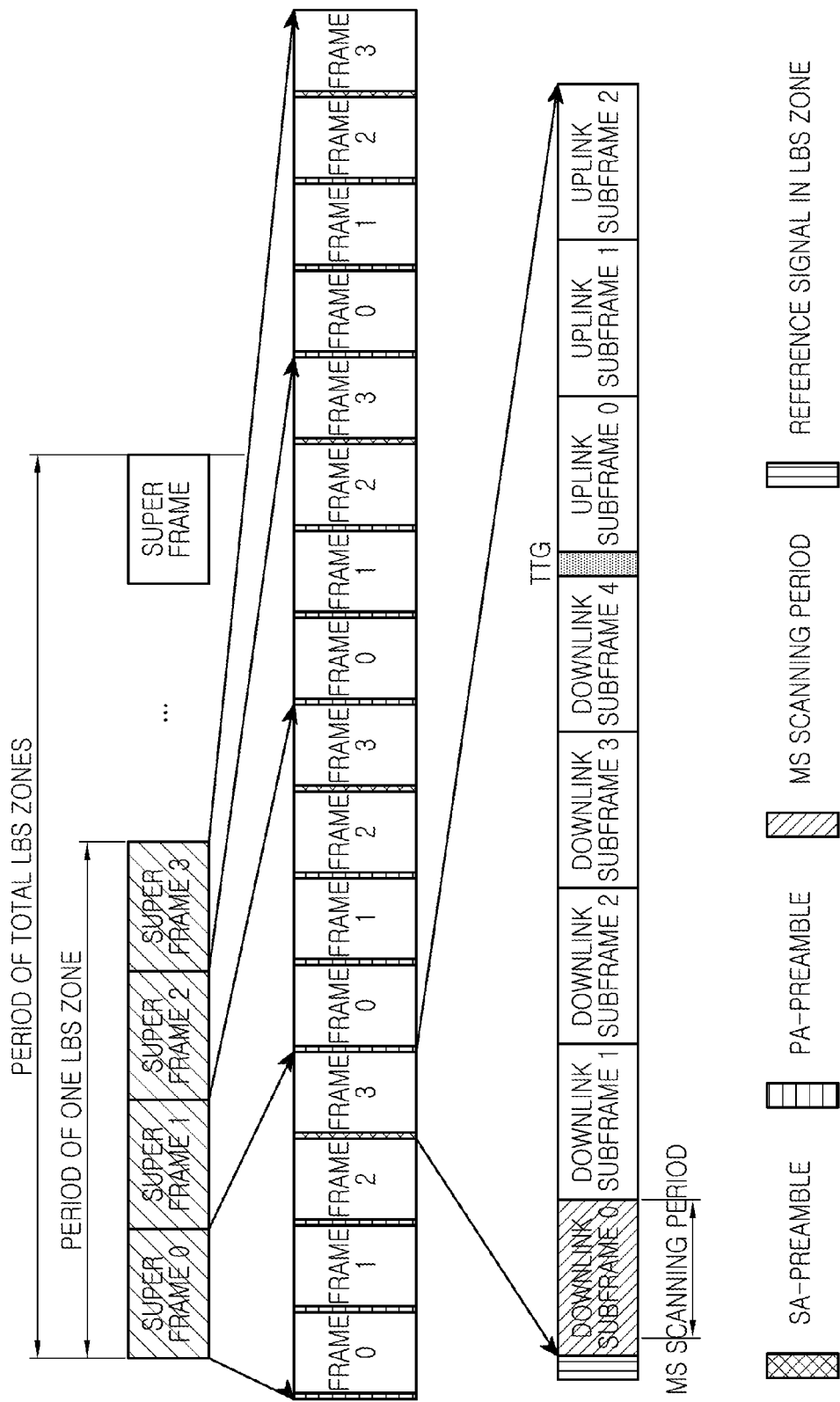
FIG. 6 is a schematic diagram illustrating an LBS zone according to an exemplary embodiment of the present invention.

FIG. 6 is a schematic diagram illustrating a LBS zone according to an exemplary embodiment of the present invention.

Referring to FIG. 6, 4 continuous super frames 0 to 3 are illustrated. Each super frame contains four frames and each frame contains ULs and DLs. In Embodiment 2, if the LBS zone is configured in one of downlink subframes in one frame of each super frame, e.g. the LBS zone includes the first OFDM symbol of the first downlink subframe in the last frame such as frame 3 of each super frame, as can be seen from FIG. 6, the LBS zone obtained is in a distributed structure and contains 4 OFDM symbols (only one OFDM symbol is shown in FIG. 6).

It should be noted that the LBS zone in Embodiment 2 may appear periodically. In addition, the OFDM symbols in the LBS zone may be other OFDM symbols of the super frames, which depend on specific situations.

In Exemplary Embodiment 2, a reference signal transmission policy based on which the time-frequency resources are allocated to a neighboring cell may be implemented indifferent ways. The exemplary implementations described below are merely examples; other implementations not described herein may also be employed.

Exemplary Implementation 1

Figure 7:
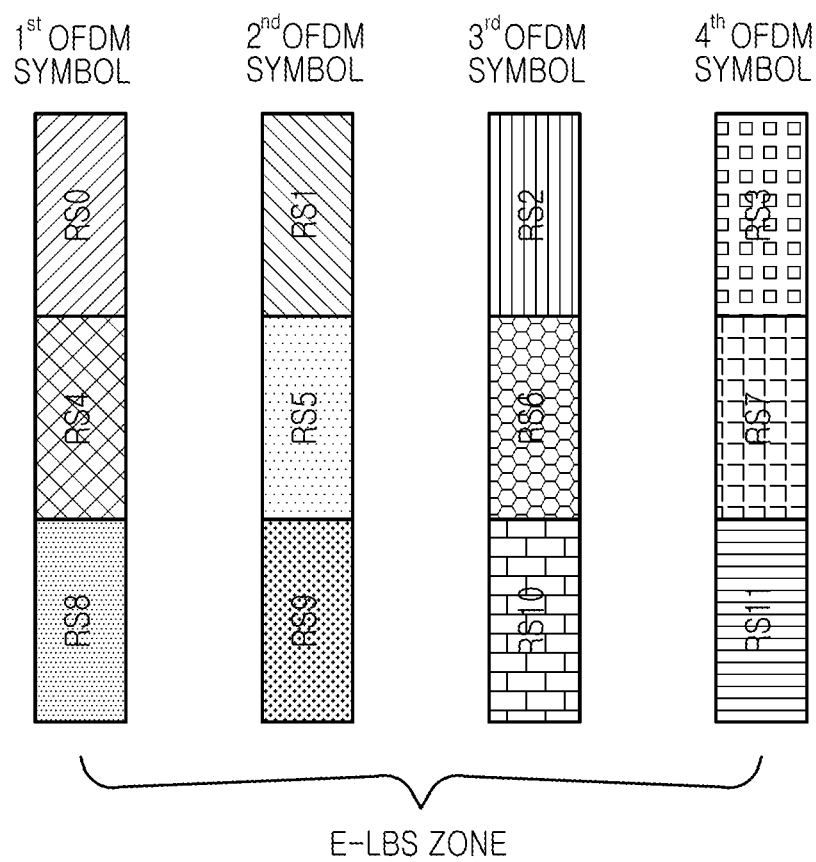
FIG. 7 is a schematic diagram illustrating first physical layer resource allocation in an LBS zone provided according to an exemplary embodiment of the present invention.

In Exemplary Implementation 1, if the LBS zone occupies the time-frequency resources of 4 OFDM symbols and frequency resources occupied by the LBS zone in each OFDM symbol are divided into 3 blocks, including frequency domain resource block 0 to frequency domain resource block 2, then 12 time-frequency resource blocks can be obtained, which are illustrated in FIG. 7.

FIG. 7 is a schematic diagram illustrating first physical layer resource allocation in the LBS zone provided according to an exemplary embodiment of the present invention.

Referring to FIG. 7 time-frequency resources occupied by the LBS zone in the 4 OFDM symbols are time-frequency resource block 0 to time-frequency resource block 11 sequentially.

The time-frequency resource blocks are grouped to obtain more than one resource group. If each time-frequency resource block is one resource group, 12 resource groups can be obtained in FIG. 7, including RS0 to RS11.

The 12 resource groups shown in FIG. 7 may be allocated to corresponding neighboring cells to be used respectively. If sectors in a neighboring cell need to be differentiated, the resource groups may be allocated according to a principle that different resource groups are allocated to different sectors. If each neighboring cell is one sector, or each neighboring cell includes only one base station which is an omni-antenna, or each sector in each neighboring cell uses the same frequency resource (i.e., in a same frequency networking mode), the resource groups may be allocated according to a principle that different resource groups are allocated to different neighboring cells.

Considering simple applications of Exemplary Implementation 1, based on the resource groups shown in FIG. 7, the resource groups may be allocated by dividing "neighboring cell ID or neighboring cell sector ID" by "the total number of resource groups obtained from the LBS zone" to obtain a remainder for each neighboring cell. A resource group with a sequence number equal to the remainder is allocated to the base station of this neighboring cell. The above processing may be represented by formula (4) below:

$$RS_{Idx}=\mathrm{mod}(IDcell, Q) \qquad (4)$$

In formula (4), IDcell represents the neighboring cell ID or neighboring cell sector ID, wherein IDcell is an ID of a neighboring cell if the neighboring cell is one sector and IDcell is an ID of a sector in a neighboring cell if the neighboring cell need be divided into sectors. Q represents the total number of the resource groups contained in the LBS zone, which is 12 in FIG. 7. $RS_{Idx}$ represents a specific resource group allocated to the IDcell.

A specific allocation of the resource groups in Implementation 1 may be illustrated in Table 4 below:

TABLE 4

| Frequency domain resources allocated | D-LBS zone symbol number | | | |
|---|---|---|---|---|
| | $1^{st}$ OFDM symbol | $2^{nd}$ OFDM symbol | $3^{rd}$ OFDM symbol | $4^{th}$ OFDM symbol |
| Frequency domain resource block 0 | RS0 | RS1 | RS2 | RS3 |
| Frequency domain resource block 1 | RS4 | RS5 | RS6 | RS7 |
| Frequency domain resource block 2 | RS8 | RS9 | RS10 | RS11 |

Exemplary Implementation 1 can realize that different IDcells correspond to different resource groups. For example, the IDcell can be represented as IDcell=256*N+Idx, wherein N represents the same as the N in the formula (1) if the IDcell is a sector ID of a neighboring cell, i.e. N represents a section number or a sector number of each sector in the neighboring cell, and values of N may be 0, 1, and 2, and wherein Idx represents each sequence number in each section, with a value ranging from 0 to 255. According to the meaning of IDcell and the formula (4), Exemplary Implementation 1 can realize that different IDcells correspond to different resource groups. As such, during network deployment, it may only be necessary to consider that neighboring cells can not occupy the same resource group and meanwhile different IDcells can correspond to different resource groups, which can achieve an objective of flexibly allocating a neighboring cell ID or neighboring cell sector ID (also referred to as IDcell). In order to reduce or avoid interference between positioning reference signals of cells and to obtain higher positioning precision, during the network deployment, it may only be necessary to consider that different resource groups are allocated to the neighboring cells or sectors, specifically, neighboring cell IDs or neighboring cell sector IDs (called IDcell by a joint name) which can bring different results to mod (IDcell, Q) are respectively allocated to the neighboring cells or sectors.

As can be seen from the foregoing, the formula (4) in Exemplary Implementation 1 is different from the formula (1) in Exemplary Embodiment 1. Formula (4) indicates that the resource group allocated to a neighboring cell is only relevant with the neighboring cell ID or neighboring cell sector ID (IDcell), while formula (1) indicates that the resource group allocated to a neighboring cell may be only relevant with sequence number parameters in each section but is not relevant to a section number. In other words, the formula (1) may be relevant with a sequence number parameter in the IDcell formula while the formula (4) is actually relevant with the IDcell itself. For example, suppose IDcell=256*N+Idx, wherein N is a fixed value, e.g. is ⅓ of the total number of neighboring cell sector IDs. According to formula (1), the resource group $RS_{Idx}$ allocated to the neighboring cell is only relevant with a sequence number Idx within each section; the formula (1) can be changed to $RS_{Idx}$=mod(Idx, Q). In comparison, the formula (4) indicates that the resource group $RS_{Idx}$ allocated to the neighboring cell is only relevant with the IDcell, i.e. relevant with both N and Idx.

As described above, the formula (1) can be applied to a situation in which sectors in each neighboring cell are not differentiated, i.e. a situation of uniformly using the time-frequency resources. This is because, if all sectors select the same Idx in different section numbers N, it will bring more restriction to deployment of the neighboring cell ID or neighboring cell sector ID. Comparatively, the formula (4) can realize flexible allocation of the neighboring cell ID or neighboring cell sector ID during network deployment. Through the formula (4), different time-frequency resources can be allocated respectively to sectors in each neighboring cell. If each neighboring cell is one sector, or each neighboring cell only includes one base station which is an omni-antenna or all sectors in each neighboring cell use the same frequency resource (i.e. in a same frequency networking mode), a resource group allocated to the neighboring cell is only relevant with the neighboring cell ID or neighboring cell sector ID.

Exemplary Implementation 2

Figure 8:
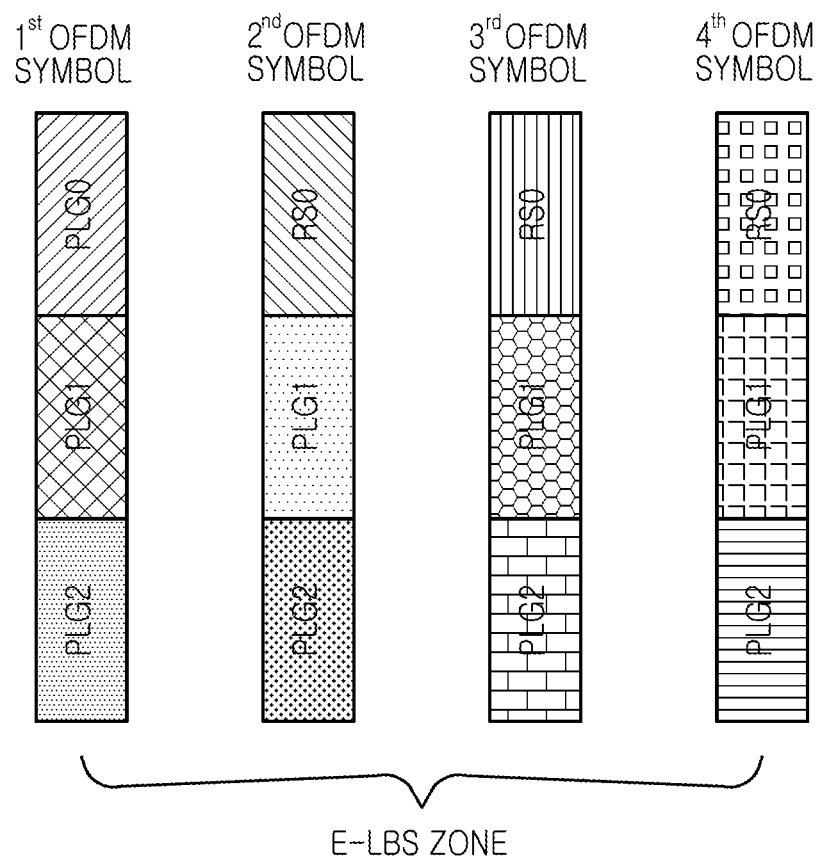
FIG. 8 is a schematic diagram illustrating second physical layer resource allocation in an LBS zone according to an exemplary embodiment of the present invention.

In Exemplary Implementation 2, if a LBS reference signal transmitted by each sector in each neighboring cell or by each neighboring cell (the case that each neighboring is one sector) occupies fixed frequency domain resources (e.g. occupies the same frequency domain resources as a synchronization signal), the frequency domain resources allocated to each sector in the neighboring cell or to each neighboring cell can be determined according to section numbers (or sector numbers). An example of Exemplary Implementation 2 is shown in FIG. 8 below. The idea of Exemplary Implementation 2 is to allocate time-frequency resources to each sector of the neighboring cell or to each neighboring cell (the case where each neighboring is one sector) according to the fixed frequency domain resources.

FIG. 8 is a schematic diagram illustrating second physical layer resource allocation in the LBS zone according to an exemplary embodiment of the present invention.

Referring to FIG. 8, the LBS zone is shown as occupying time-frequency resources of 4 OFDM symbols. If frequency resources occupied by the LBS zone in each OFDM symbol are divided into 3 blocks, including frequency domain resource block 0 to frequency domain resource block 2, then 12 time-frequency resource blocks can be obtained. If time-frequency resource blocks within the same number in the 4 OFDM symbols form one resource group, 3 resource groups are obtained as shown in FIG. 8, including RS0 to RS2. As can be seen from FIG. 8, each RS includes 4 time-frequency resource blocks.

The time-frequency resource blocks in the 3 resource groups shown in FIG. 8 are allocated to corresponding neighboring cells. The allocation may be implemented according to formula (5) below:

$$RS_i=\text{floor}(IDcell/Q) \quad (5)$$

In formula (5), $RS_i$ represents a resource group allocated to an IDcell, and based on FIG. 8, i ranges from 0 to 2. Q represents the total number of sequence numbers in each section in the IDcell. If IDcell=256*N+Idx, then Q is 256. Floor is an operation of returning a maximum integer which is not larger than a parameter, i.e. IDcell/Q. As can be seen from formula (5), when the IDcell represents a sector ID of a neighboring cell, numbers of sectors in the neighboring cell are 0, 1, and 2 respectively, which correspond to numbers of resource groups 0, 1, and 2 respectively. According to a number of a sector, Exemplary Implementation 2 determines a number of a resource group allocated to the sector.

Through formula (5), a number of a resource group allocated to a neighboring cell or a neighboring cell sector can be determined. However, as can be seen from FIG. 8, because one resource group contains 4 time-frequency resource blocks, which time-frequency resource block in a resource group is allocated to a corresponding neighboring cell or neighboring cell sector may also be determined.

For example, if the number of the resource group determined through the formula (5) is RS0, it is required to determine which time-frequency resource block in the RS0 should be currently allocated to a neighboring cell or a neighboring cell sector. Because the 4 time-frequency resource blocks in the RS0 occupy different OFDM symbols respectively, it is possible to determine which OFDM symbol's time-frequency resource block in the RS0 should be allocated to the neighboring cell or the neighboring cell sector. Formula (6) below provides how to determine an OFDM symbol in which a time-frequency resource block allocated to the neighboring cell or neighboring cell sector is located:

$$s=\text{mod}(IDcell, P) \quad (6)$$

In formula (6), s represents an ID of the OFDM symbol in which the allocated time-frequency resource block is located, with a value of 0, 1, 2, or P−1. P represents the total number of OFDM symbols occupied by the LBS zone. In FIG. 8, there are 4 OFDM symbols, and therefore P is 4 and s may be 0, 1, 2, or 3.

Accordingly, through the formula (5) and the Formula (6), the time-frequency resource blocks can be allocated to corresponding neighboring cells or neighboring cell sectors.

A specific allocation may be shown in Table 5 below:

TABLE 5

| | D-LBS zone symbol number | | | |
|---|---|---|---|---|
| Frequency domain resources allocated | 1st OFDM symbol s = 0 | 2nd OFDM symbol s = 1 | 3rd OFDM symbol s = 2 | 4th OFDM symbol s = 3 |
| Frequency domain resource block 0 | RS0 | RS0 | RS0 | RS0 |
| Frequency domain resource block 1 | RS1 | RS1 | RS1 | RS1 |
| Frequency domain resource block 2 | RS2 | RS2 | RS2 | RS2 |

It should be noted that, in Exemplary Implementation 2, in order to reduce or avoid interference between positioning reference signals of cells and to obtain higher positioning precision, during the network deployment, it should be ensured that neighboring cell IDs or neighboring cell sector IDs (called IDcell) which can bring different results to one of mod (IDcell, P) and floor(IDcell/Q) are allocated to neighboring cells respectively.

Exemplary Implementation 3

Figure 9:
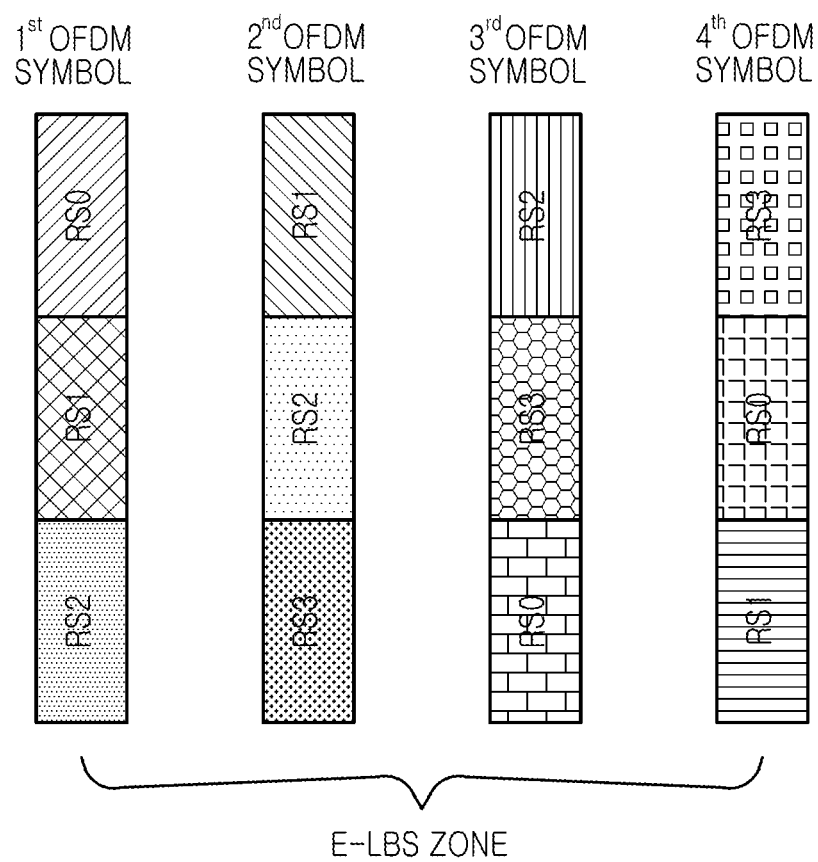
FIG. 9 is a schematic diagram illustrating third physical layer resource allocation in the LBS zone according to an exemplary embodiment of the present invention.

FIG. 9 is a schematic diagram illustrating third physical layer resource allocation in the LBS zone according to an exemplary embodiment of the present invention.

Referring to FIG. 9, the LBS zone is shown as occupying time-frequency resources of 4 OFDM symbols. Frequency resources occupied by the LBS zone in each OFDM symbol are divided into 3 blocks, including frequency domain resource block 0 to frequency domain resource block 2 as shown in Table 6 below. Accordingly, 12 time-frequency resource blocks can be obtained in FIG. 9. In Exemplary Implementation 3, if three time-frequency resource blocks form one resource group and each resource group is determined according to a principle that time-frequency resource blocks in each resource group occupy different OFDM symbols and different frequency domain resources, 4 resource groups can be obtained in FIG. 9, including RS0~RS4, and time-frequency resource blocks in each of the RS0~RS4 follow the above principle. It should be noted that, FIG. 9 is just one specific implementation example of Exemplary Implementation 3, other implementation examples can be obtained according to the above principle and will not be described in detail again.

The time-frequency resource blocks are allocated to sectors of neighboring cells or to neighboring cells according to the IDcell such as neighboring cell sector IDs or neighboring cell IDs. During the allocation, a number of a resource group is determined first, which can be described in formula (7) below:

$$RS_i = \mathrm{mod}(\mathrm{IDcell}, P) \quad (7)$$

In formula (7), $RS_i$ represents a resource group allocated to an IDcell, i ranges from 0 to 3. P represents the total number of the resource groups, which is 4 in the example shown in FIG. 9.

As can be seen from the formula (7), after a sector ID of a neighboring cell or a neighboring cell ID is determined, a resource group allocated to the neighboring cell or the neighboring cell sector is accordingly determined. In addition, because time-frequency blocks in the resource group occupy different OFDM symbols and also different frequency domain resources, it is easy to determine which OFDM symbol's time-frequency resource block should be allocated to the neighboring cell or neighboring cell sector to be used. The determining may be implemented according to formula (8) below:

$$s = \mathrm{mod}(RS_i - \mathrm{floor}(\mathrm{IDcell}/Q), R) \quad (8)$$

In formula (8), s represents an ID of an OFDM symbol occupied by the LBS zone, s=0, 1, 2, R−1. R represents the total number of OFDM symbols occupied by the LBS zone. $RS_i$ is determined according to the formula (7). Q represents the total number of sequence numbers in each section in the IDcell; if IDcell=256*N+Idx, then Q is 256. In FIG. 9, the LBS zone occupies 4 OFDM symbols, and therefore R is 4 and s may be 0, 1, 2, or 3.

The formula (7) can determine which resource group can be allocated to a neighboring cell or neighboring cell sector and the formula (8) can determine which time-frequency resource block in the resource group can be allocated to the neighboring cell or neighboring cell sector. Thus, through the formulae (7) and (8), frequency resource blocks can be allocated to the neighboring cell or neighboring cell sector.

A specific allocation of the resource groups may be illustrated in Table 6 below:

TABLE 6

| | D-LBS zone symbol number | | | |
|---|---|---|---|---|
| Frequency domain resources allocated | 1st OFDM symbol s = 0 | 2nd OFDM symbol s = 1 | 3rd OFDM symbol s = 2 | 4th OFDM symbol s = 3 |
| Frequency domain resource block 0 | RS0 | RS1 | RS2 | RS3 |
| Frequency domain resource block 1 | RS1 | RS2 | RS3 | RS0 |
| Frequency domain resource block 2 | RS2 | RS3 | RS0 | RS1 |

Although not described herein, it is also possible to determine each resource group according to a principle that time-frequency resource blocks in each resource group occupy the same OFDM symbol but different frequency domain resources.

In Exemplary Implementation 3, in order to reduce or avoid interference between positioning reference signals of cells and to obtain higher positioning precision, during the network deployment, it should be ensured that neighboring cell IDs or neighboring cell sector IDs (called IDcell) which can bring different results to one of mod (IDcell, P) and floor(IDcell/Q) are allocated to neighboring cells respectively.

In Exemplary Embodiment 2, the frequency resource block allocated to the neighboring cell or neighboring cell sector may be determined according to the Formula (6) of Exemplary Implementation 2 or the formula (8) of Exemplary Implementation 3. However, other allocation methods may also be used if the other allocation methods follow the principle that the time-frequency resource blocks may occupy the same resource group but different OFDM symbols, or may occupy different resource groups and also different OFDM symbols, or may occupy different resource groups but the same OFDM symbol.

According to exemplary embodiments of the present invention, time-frequency resources occupied by OFDM symbols of N downlink subframes in a super frame are taken as the LBS zone, or time-frequency resources occupied by OFDM symbols of N downlink subframes in M super frames are taken as the LBS zone, where M<=N. Thereafter, the serving base station transmits the indication information containing information of the super frame(s) wherein the LBS zone is located, which can avoid interference of serving cell signals on neighboring cell signals.

In addition, according to exemplary embodiments of the present invention, only the time-frequency resources corresponding to part of OFDM symbols in N downlink subframes and a preset frequency band occupied by part of OFDM symbols are taken as the LBS zone, while the remaining time-frequency resources in the downlink subframes may be used for transmitting a control signal, or used for transmitting a control signal and a data signal. Therefore, transmission of information such as ACK or NACK in subframes can be ensured and uplink resources can be allocated to the MS. Further, HARQ timing synchronization requirements are satisfied and meanwhile system resource allocation principles are followed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for positioning a Mobile Station (MS) by a base station (BS), the method comprising:
   determining a location based services (LBS) group index, based on a cell identity of the BS and a number of LBS group; and
   transmitting a location beacon signal on a LBS zone symbol and a frequency domain resource corresponding to the LBS group index,
   wherein the LBS group index is determined by the following equation:

$RS_i=\text{mod}(\text{mod}(\text{IDcell},N),Q)$ where $RS_i$ represents the LBS group index, IDcell represents the cell identity of the BS, Q represents the number of LBS group, N represents a positive integer and mod represents an operation for calculating a remainder.

2. The method of claim 1, wherein the LBS zone symbol and the frequency domain resource are determined from the LBS group index based on a following table:

| Frequency domain resources allocated | D-LBS zone symbol number | | | |
|---|---|---|---|---|
| | $1^{st}$ OFDM symbol | $2^{nd}$ OFDM symbol | $3^{rd}$ OFDM symbol | $4^{th}$ OFDM symbol |
| Frequency domain resource block 0 | RS0 | RS1 | RS2 | RS3 |
| Frequency domain resource block 1 | RS4 | RS5 | RS6 | RS7 |
| Frequency domain resource block 2 | RS8 | RS9 | RS10 | RS11. |

3. The method of claim 2, wherein the LBS zone symbol is determined by the following equation:

$s=\text{mod}(RS_i,4)$ where s represents an index of the LBS zone symbol, $RS_i$ represents the LBS group index and mod represents an operation for calculating a remainder.

4. The method of claim 2, wherein the frequency domain resource is determined by the following equation:

$n=\text{floor}(RS_i/4)$ where s represents an index of the frequency domain resource, $RS_i$ represents the LBS group index and mod represents an operation of returning a maximum integer which is not larger than $RS_i/4$.

5. A base station (BS) for positioning a Mobile Station (MS), the BS comprising:
   a controller for determining a location based services (LBS) group index, based on a cell identity of the BS and a number of LBS group; and
   a transmitter for transmitting a location beacon signal on a LBS zone symbol and a frequency domain resource corresponding to the LBS group index,
   wherein the LBS group index is determined by the following equation:

$RS_i=\text{mod}(\text{mod}(\text{IDcell},N),Q)$ where $RS_i$ represents the LBS group index, IDcell represents the cell identity of the BS, Q represents the number of LBS group, N represents a positive integer and mod represents an operation for calculating a remainder.

6. The BS of claim 5, wherein the LBS zone symbol and the frequency domain resource are determined from the LBS group index based on a following table:

| Frequency domain resources allocated | D-LBS zone symbol number | | | |
|---|---|---|---|---|
| | $1^{st}$ OFDM symbol | $2^{nd}$ OFDM symbol | $3^{rd}$ OFDM symbol | $4^{th}$ OFDM symbol |
| Frequency domain resource block 0 | RS0 | RS1 | RS2 | RS3 |
| Frequency domain resource block 1 | RS4 | RS5 | RS6 | RS7 |
| Frequency domain resource block 2 | RS8 | RS9 | RS10 | RS11. |

7. The BS of claim 6, wherein the LBS zone symbol is determined by the following equation:

$s=\text{mod}(RS_i,4)$ where s represents an index of the LBS zone symbol, $RS_i$ represents the LBS group index and mod represents an operation for calculating a remainder.

8. The BS of claim 6, wherein the frequency domain resource is determined by the following equation:

$n=\text{floor}(RS_i/4)$ where s represents an index of the frequency domain resource, $RS_i$ represents the LBS group index and mod represents an operation of returning a maximum integer which is not larger than $RS_i/4$.

9. A method for positioning a Mobile Station (MS) by the MS, the method comprising:
   receiving a location beacon signal on a LBS zone symbol and a frequency domain resource corresponding to a location based services (LBS) group index; and
   performing a positioning based on the location beacon signal,
   wherein the LBS group index is determined based on a cell identity of a BS and a number of LBS group by the BS,
   wherein the LBS group index is determined by the following equation:

$RS_i=\text{mod}(\text{mod}(\text{IDcell},N),Q)$ where $RS_i$ represents the LBS group index, IDcell represents the cell identity of the BS, Q represents the number of LBS group, N represents a positive integer and mod represents an operation for calculating a remainder.

10. The method of claim 9, wherein the LBS zone symbol and the frequency domain resource are determined from the LBS group index based on a following table:

| Frequency domain resources allocated | D-LBS zone symbol number | | | |
|---|---|---|---|---|
| | $1^{st}$ OFDM symbol | $2^{nd}$ OFDM symbol | $3^{rd}$ OFDM symbol | $4^{th}$ OFDM symbol |
| Frequency domain resource block 0 | RS0 | RS1 | RS2 | RS3 |
| Frequency domain resource block 1 | RS4 | RS5 | RS6 | RS7 |
| Frequency domain resource block 2 | RS8 | RS9 | RS10 | RS11. |

11. The method of claim 10, wherein the LBS zone symbol is determined by the following equation:

$$s=\mathrm{mod}(RS_i,4)$$

where s represents an index of the LBS zone symbol, $RS_i$ represents the LBS group index and mod represents an operation for calculating a remainder.

12. The method of claim 10, wherein the frequency domain resource is determined by the following equation:

$$n=\mathrm{floor}(RS_i/4)$$

where s represents an index of the frequency domain resource, $RS_i$ represents the LBS group index and mod represents an operation of returning a maximum integer which is not larger than $RS_i/4$.

13. A Mobile Station (MS) for positioning, the MS comprising:
a receiver for receiving a location beacon signal on a LBS zone symbol and a frequency domain resource corresponding to a location based services (LBS) group index; and
a controller for performing a positioning based on the location beacon signal,
wherein the LBS group index is determined based on a cell identity of a BS and a number of LBS group by the BS,
wherein the LBS group index is determined by the following equation:

$$RS_i=\mathrm{mod}(\mathrm{mod}(\mathrm{IDcell},N),Q)$$

where $RS_i$ represents the LBS group index, IDcell represents the cell identity of the BS, Q represents the number of LBS group, N represents a positive integer and mod represents an operation for calculating a remainder.

14. The MS of claim 13, wherein the LBS zone symbol and the frequency domain resource are determined from the LBS group index based on a following table:

| Frequency domain resources allocated | D-LBS zone symbol number | | | |
|---|---|---|---|---|
| | $1^{st}$ OFDM symbol | $2^{nd}$ OFDM symbol | $3^{rd}$ OFDM symbol | $4^{th}$ OFDM symbol |
| Frequency domain resource block 0 | RS0 | RS1 | RS2 | RS3 |
| Frequency domain resource block 1 | RS4 | RS5 | RS6 | RS7 |
| Frequency domain resource block 2 | RS8 | RS9 | RS10 | RS11. |

15. The MS of claim 14, wherein the LBS zone symbol is determined by the following equation:

$$s=\mathrm{mod}(RS_i,4)$$

where s represents an index of the LBS zone symbol, $RS_i$ represents the LBS group index and mod represents an operation for calculating a remainder.

16. The MS of claim 14, wherein the frequency domain resource is determined by the following equation:

$$n=\mathrm{floor}(RS_i/4)$$

where s represents an index of the frequency domain resource, $RS_i$ represents the LBS group index and mod represents an operation of returning a maximum integer which is not larger than $RS_i/4$.

* * * * *